(12) United States Patent
Noriega Escobar et al.

(10) Patent No.: US 7,314,363 B2
(45) Date of Patent: Jan. 1, 2008

(54) DEVICE TO VISUALIZE IN-LINE AND QUANTIFY THE POLYMER MELTING IN PLASTICATING SCREW MACHINES WITHOUT SIGNIFICANTLY AFFECTING ITS THERMAL REGIME

(75) Inventors: Maria Del Pilar Noriega Escobar, Medellin (CO); Alberto Naranjo Carvajal, Medellin (CO); Tim Andreas Osswald, Madison, WI (US); Nicola Ferrier, Madison, WI (US)

(73) Assignee: ICIPC-Instituto de Capacitacion e Investigacion del Plastico y del Caucho, Medellin (CO)

( * ) Notice: Subject to any disclaimer, the term of this patent is extended or adjusted under 35 U.S.C. 154(b) by 576 days.

(21) Appl. No.: 10/780,290

(22) Filed: Feb. 17, 2004

(65) Prior Publication Data
US 2005/0073067 A1 Apr. 7, 2005

(30) Foreign Application Priority Data
Feb. 14, 2003 (CO) ...................................... 012620

(51) Int. Cl.
*B29C 45/76* (2006.01)

(52) U.S. Cl. ...................... 425/169; 425/170; 425/173; 425/550

(58) Field of Classification Search ................ 425/169, 425/173, 170, 550
See application file for complete search history.

(56) References Cited

U.S. PATENT DOCUMENTS

| | | | |
|---|---|---|---|
| 4,529,370 A * | 7/1985 | Holmes et al. | 425/171 |
| 4,721,448 A * | 1/1988 | Irish et al. | 425/173 |
| 4,959,186 A * | 9/1990 | Dollhopf et al. | 425/173 |
| 5,310,332 A * | 5/1994 | Ito et al. | 425/169 |
| 7,022,271 B2 * | 4/2006 | Suganuma | 425/173 |

* cited by examiner

*Primary Examiner*—Tim Heitbrink
(74) *Attorney, Agent, or Firm*—Ladas & Parry LLP (57) ABSTRACT

A device to visualize in-line the polymer melting in plasticating screw machines has an external metallic cylinder to be fixed in radial position regarding the barrel of the plasticating machine, a bushing with an optical window clear to the visible light spectrum resistant to pressure and temperature positioned in such a way that its external face is tangent to the internal surface of the barrel of the plasticating machine, and an internal metallic cylinder to guide the coolant gas and allow the use of an observation probe with operating temperature limits and an illumination system.

10 Claims, 10 Drawing Sheets

DEVICE TO VISUALIZE IN-LINE AND QUANTIFY THE POLYMER MELTING IN PLASTICATING SCREW MACHINES WITHOUT SIGNIFICANTLY AFFECTING ITS THERMAL REGIME

SUMMARY

The invention comprises a method and a device to visualize in-line and quantify the polymer melting in plasticating screw machines during processes that may include phase changes of the polymeric material under study, such as extrusion, blow molding and injection molding. The invention is based on the need to visualize and quantify the polymer melting in plasticating screw machines in real time, safely and non-invasive to the process to be able to maintain its thermal regime. The problem is solved by capturing images in-line and experimental data from the inside of the plasticating screw machine through a device with a small optical window, which allows the use of an observation probe with operating temperature limits and with an illumination system. The device allows to visualize the differences in optical properties between the polymer's solid state and its melt state enabling to describe its complete melting mechanism in a plasticating screw machine. The device allows to visualize all of the states or phases of the polymer melting process, such as the solid material, the formation of the first melt film, the delay in the formation of the melt pool, the molten material and anomalies in the melting, in case these latter exist, since several polymers do not present them. The device is comprised of an external metallic cylinder to be set in radial position regarding the barrel of the plasticating machine, a bushing with an optical window clear to the visible light spectrum, resistant to the pressure and to the temperature, positioned in such a manner that its external face is tangent to the internal surface of the plasticating machine's barrel, and an internal metallic cylinder to guide the coolant gas and enable the use of an observation probe with operating temperature limits and with an illumination system. The method to quantify the polymer melting in plasticating screw machines comprises the following stages:

Location of several devices along the barrel of the plasticating screw machine;

In-line visualization of the polymer inside the machine either in solid, melt state or in co-existing states, through an observation probe placed in the device;

Joint calibration of the device's optical window and of the observation probe to determine the relationship between the visualized image and the quantified image in pixels, and thus, guarantee the precision of the measurements from the observed images;

Recording of the polymer's plasticating process by capturing the images in-line and the experimental data from the inside of the plasticating screw machine with a camera and a video recorder;

Determination of the solids bed's position and width from the obtained images, operating conditions and plasticating machine's geometry using an image analyzer program or software; and Calculation of the polymer's melting profile visualized in the plasticating screw machine.

DESCRIPTION

The invention comprises a method and a device to visualize in-line and quantify polymer melting in plasticating screw machines during processes that can include phase changes of the polymeric material under study, such as extrusion, blow molding and injection molding.

As it is widely known in the scientific and technical community, the existing experimental techniques designed to study the melting of polymers inside a plasticating screw machine suffer a very limited functionality and very tedious procedures. The techniques developed in the last decades are invasive to the process, highly time consuming, difficult to implement, and expensive. The invasive nature affects the polymer's characteristics of friction and heat transfer inside the plasticating screw machine, significantly influencing the measured parameters and consequently, the results, particularly the polymer's melting profile.

The first experimental method to analyze polymer melting in plasticating screw machines was developed by Maddock and Street, and consisted in abruptly stopping an extruder in operation and cooling both the barrel and the screw, and then remove the screw from the barrel, remove the polymer from its spirals and cut it in perpendicular sections to the screw's flights. To visualize details of the melting process with this technique, they added a small amount of pigmented polymer or tracer, which made it possible to distinguish the polymer's regions in solid state and in melt state. This technique is known as the extraction technique, which is very intensive in time consumption, requirements for the experimentation and costs. Tadmor developed a theoretical model based on Maddok's experimentation methodology to predict the profile of the polymer melting in plasticating single screw machines. Based on this model, other authors have developed similar models for plasticating machines with more than one screw. The most recently developed experimental method, towards the end of the 90's, to analyze the polymer melting in plasticating screw machines was developed by Wong, Zhu and collaborators based on an extruder with a barrel equipped with large glass windows on both sides of the barrel. Important results were obtained with this technique, but it resulted invasive to the process and affected the polymer's heat transfer within the plasticating screw machine and thus, negatively influencing the measured parameters and consequently, the results. Additionally, this method presented a risk for the extruder's operator inherent to the rupture of the large glass windows.

The general objective of the herein invention is to visualize and quantify the polymer melting in plasticating screw machines in real time, safely and non-invasive to the process, to be able to maintain its thermal regime providing a method and a device according to claims 1 to 12. The problem is solved by capturing images in-line and experimental data from the inside of the plasticating screw machine through a device with a small optical window, which allows the use of an observation probe with operating temperature limits and with an illumination system. The device allows to visualize the differences in optical properties between the solid state and the melt state of a polymer allowing to describe its complete melting mechanism in a plasticating screw machine.

To clarify the invention even more and its advantages compared with the existing techniques, the device and the method are described with the help of the enclosed drawings.

Figure 1:
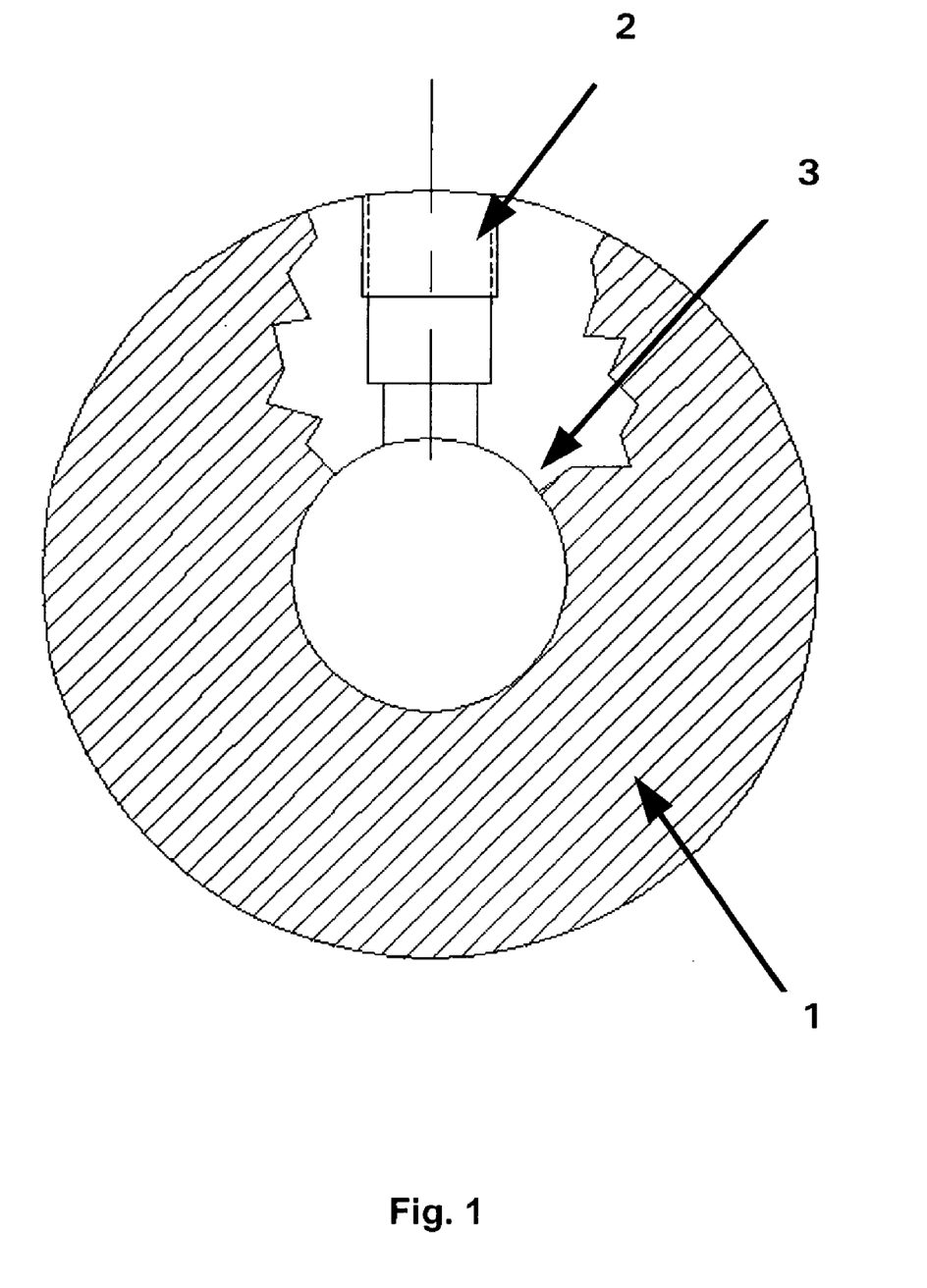
FIG. 1 schematically shows a cross-section of the barrel of a plasticating screw machine, which points out the device radially fixed on it and tangent to the barrel's internal surface.

With reference to the FIGS. as can be seen in FIG. 1, a barrel of a plasticating screw machine generically indicated as 1 has a device screwed on or fixed indicated as 2 radially and tangent to the barrel's internal surface indicated as 3 of the plasticating machine.

Figure 2:
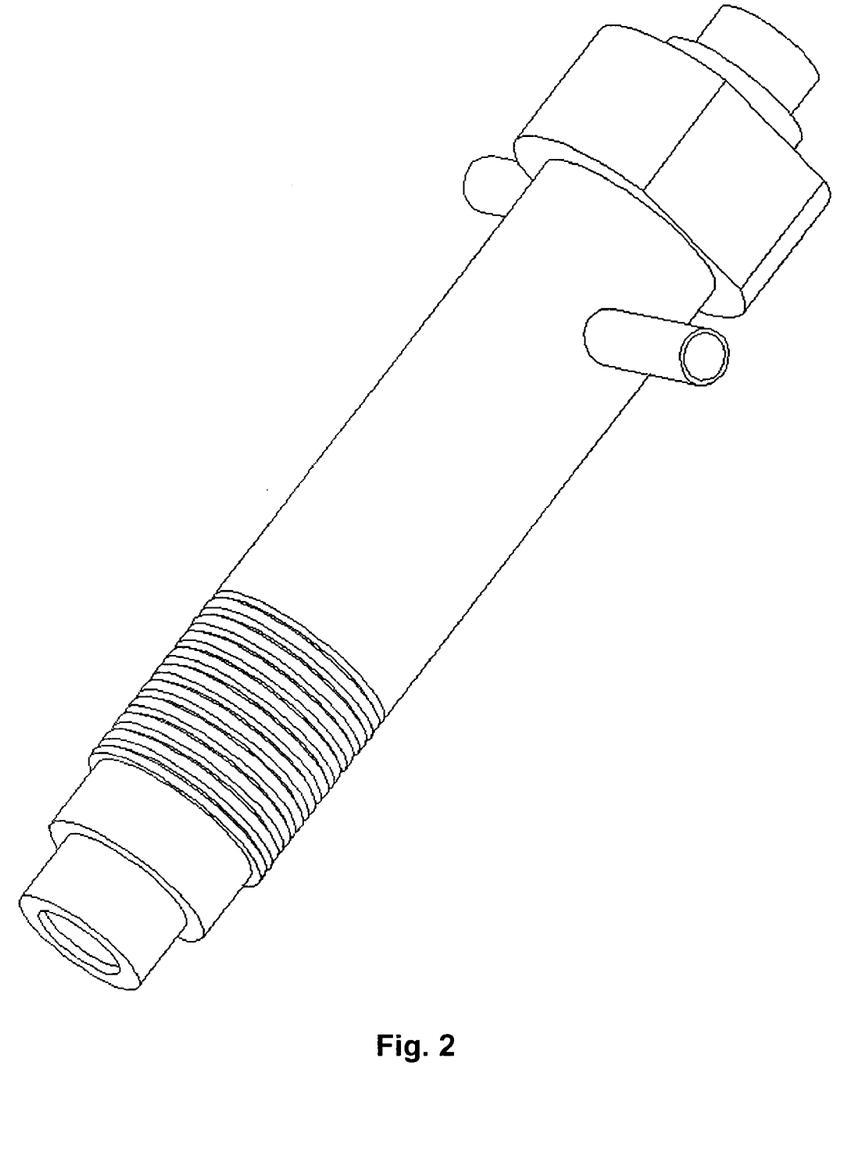
FIG. 2 shows a perspective representation of the device to visualize in-line the polymer melting in plasticating screw machines.
Figure 3:
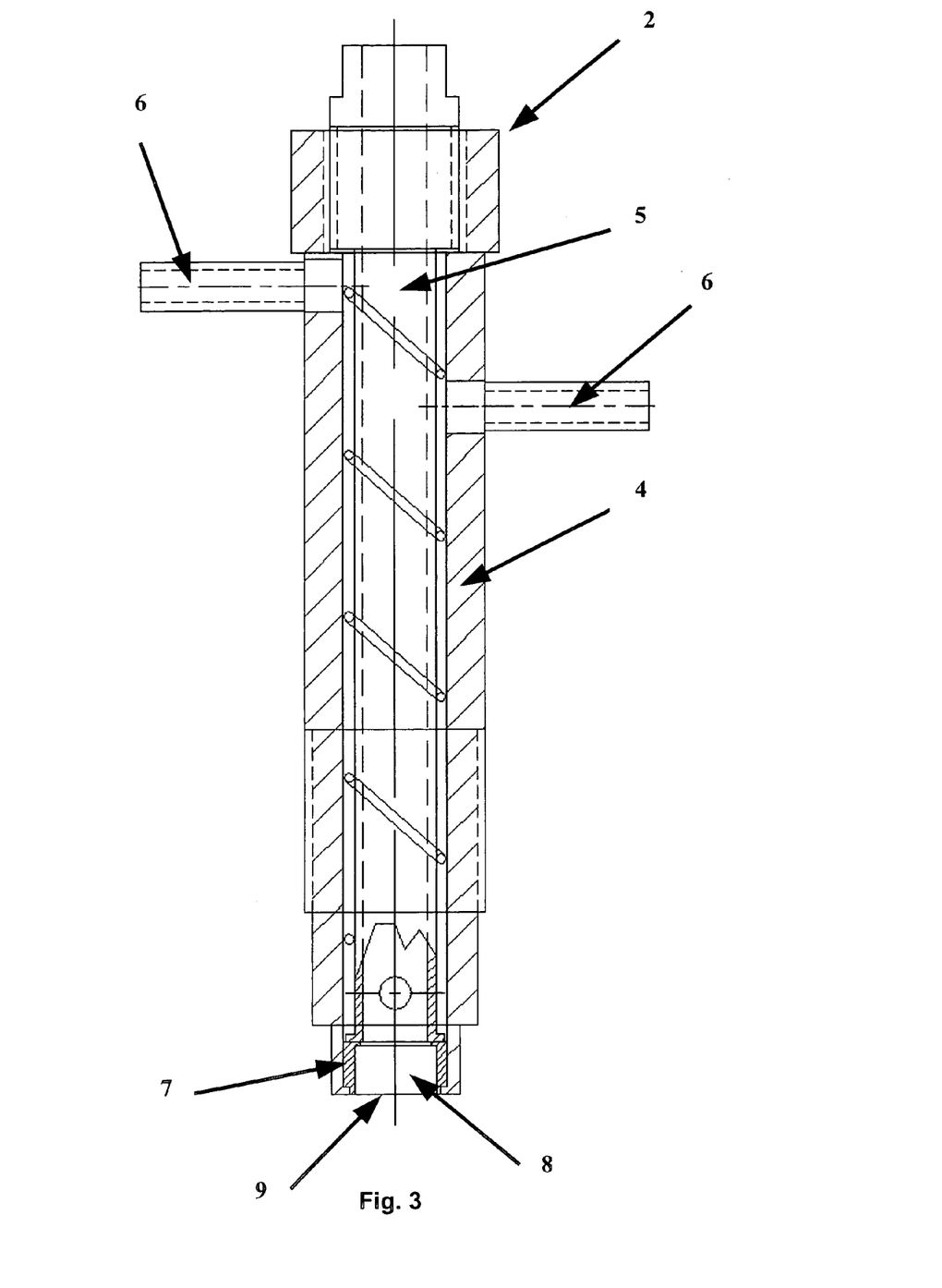
FIG. 3 schematically shows a view of the device with all of its assembled components.
Figure 4:
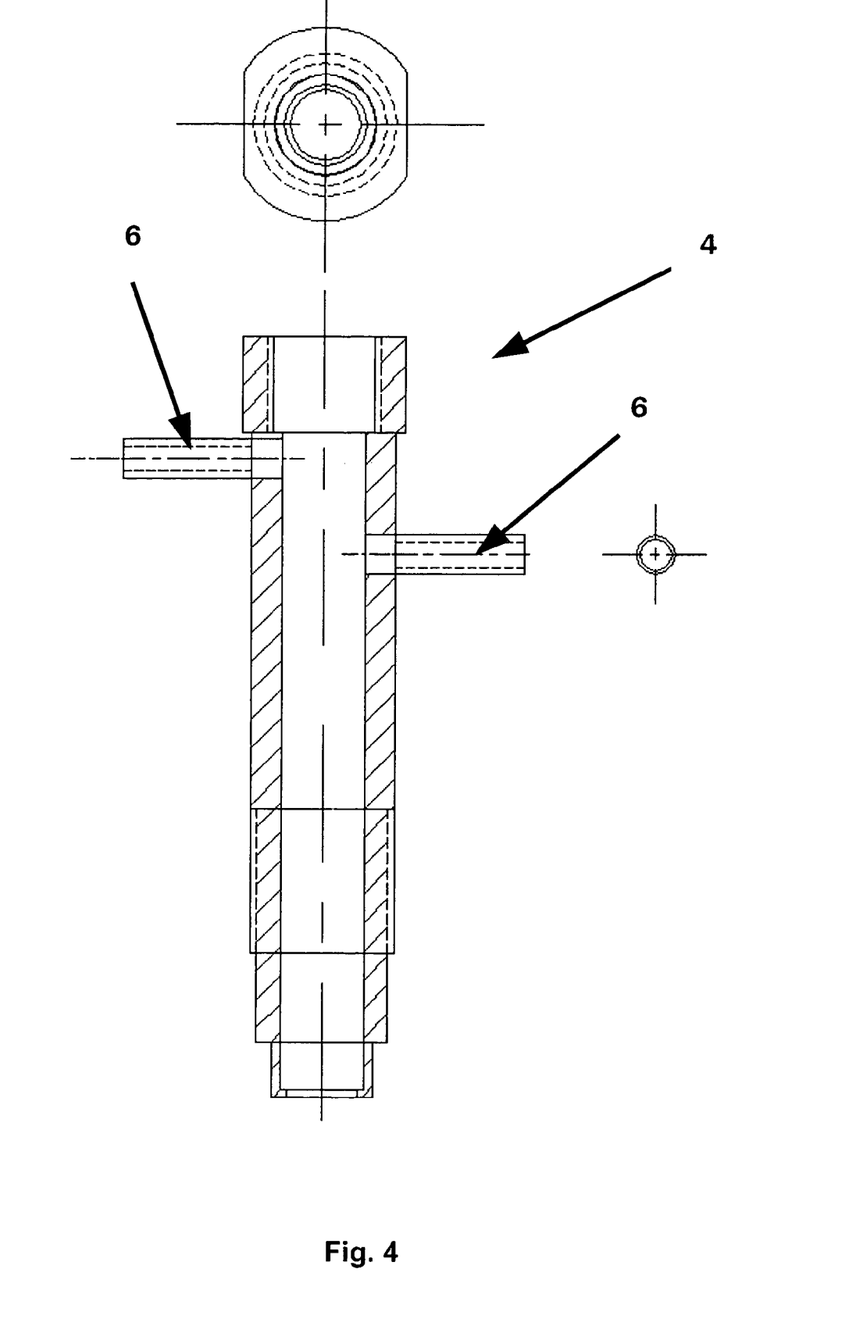
FIG. 4 schematically shows the external metallic cylinder of the device with its connections for the inlet and outlet of the coolant gas.
Figure 5:
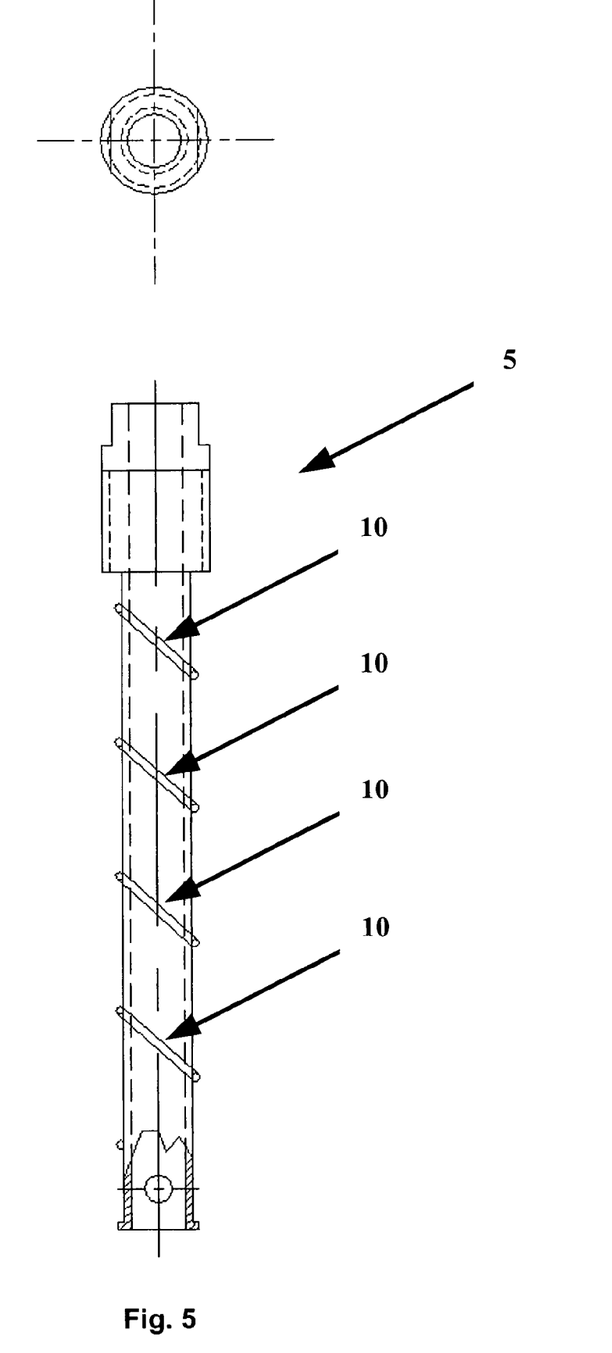
FIG. 5 schematically shows the internal metallic cylinder of the device, which guides the coolant gas and receives inside the observation probe (omitted in the FIG.).
Figure 6A:
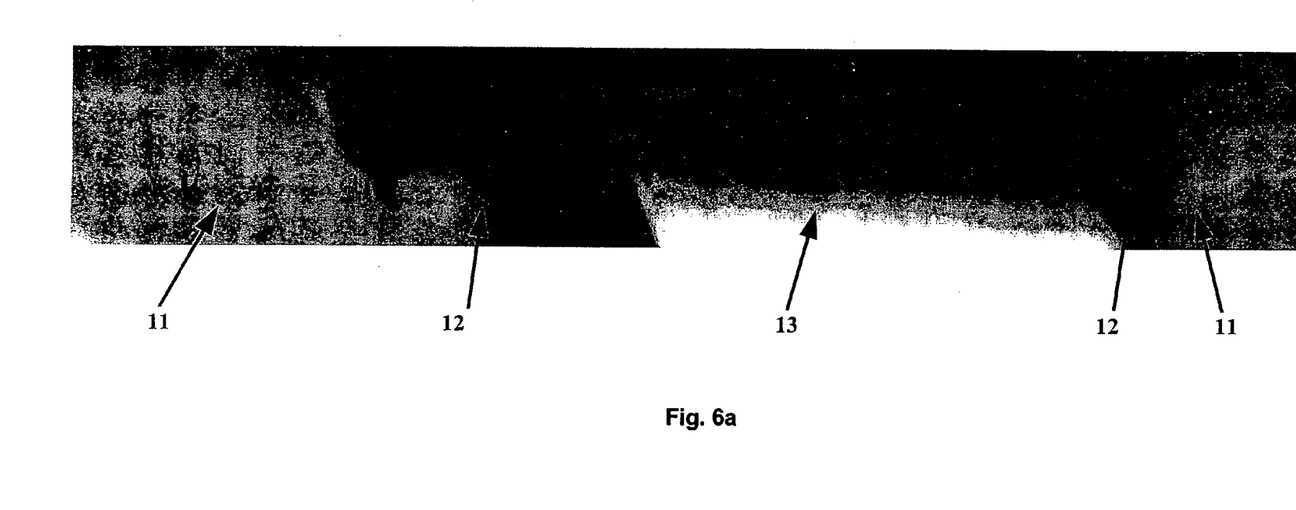
FIG. 6a shows as an example of the invention of an image captured from the inside of the plasticating screw machine, whereby one can visualize the polymer's solid state, the polymer's melt state and the screw's flight.
Figure 6B:
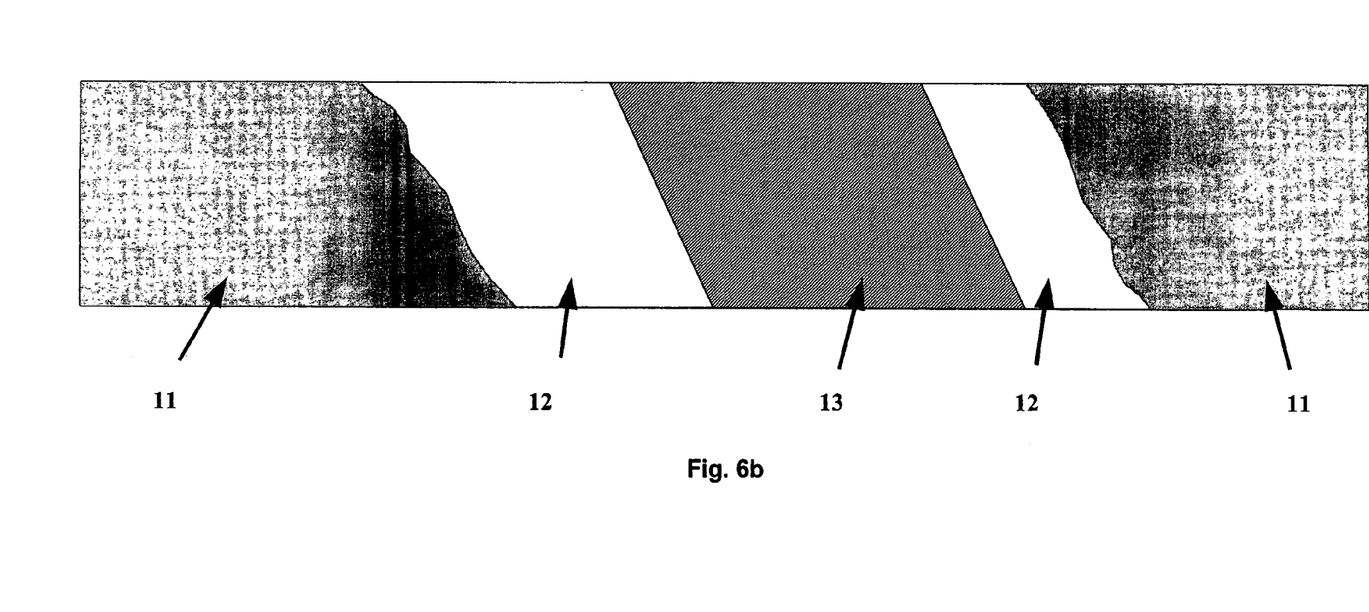
FIG. 6b shows as an example of the invention an internal schematic of the plasticating screw machine, whereby it can be identified the solid state of the polymer, the melt state of the polymer and the screw's flight.
Figure 7:
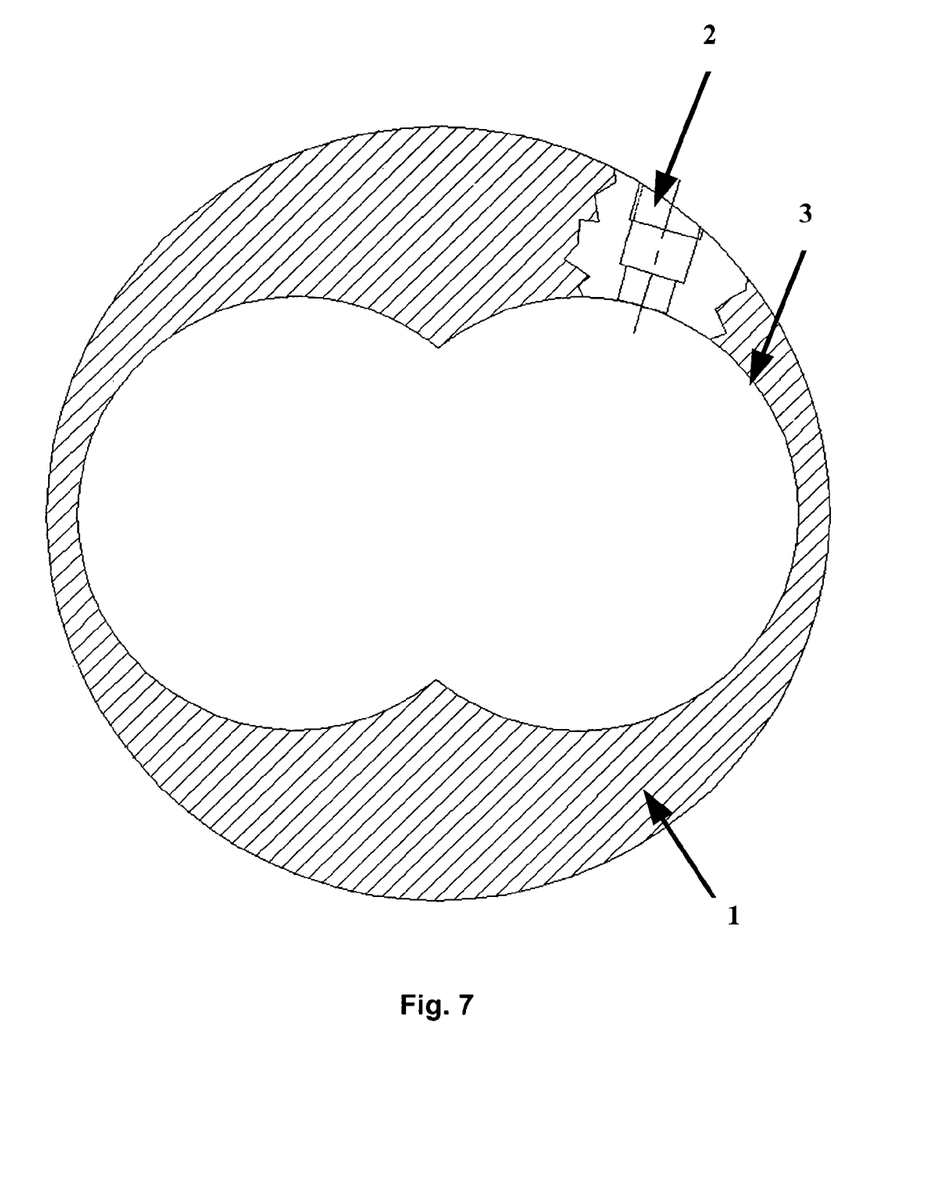
FIG. 7 schematically shows a cross-section of the barrel of another type of plasticating machine with more than one screw, where it is possible to observe the device fixed to it and tangent to the barrel's internal surface.
Figure 8:
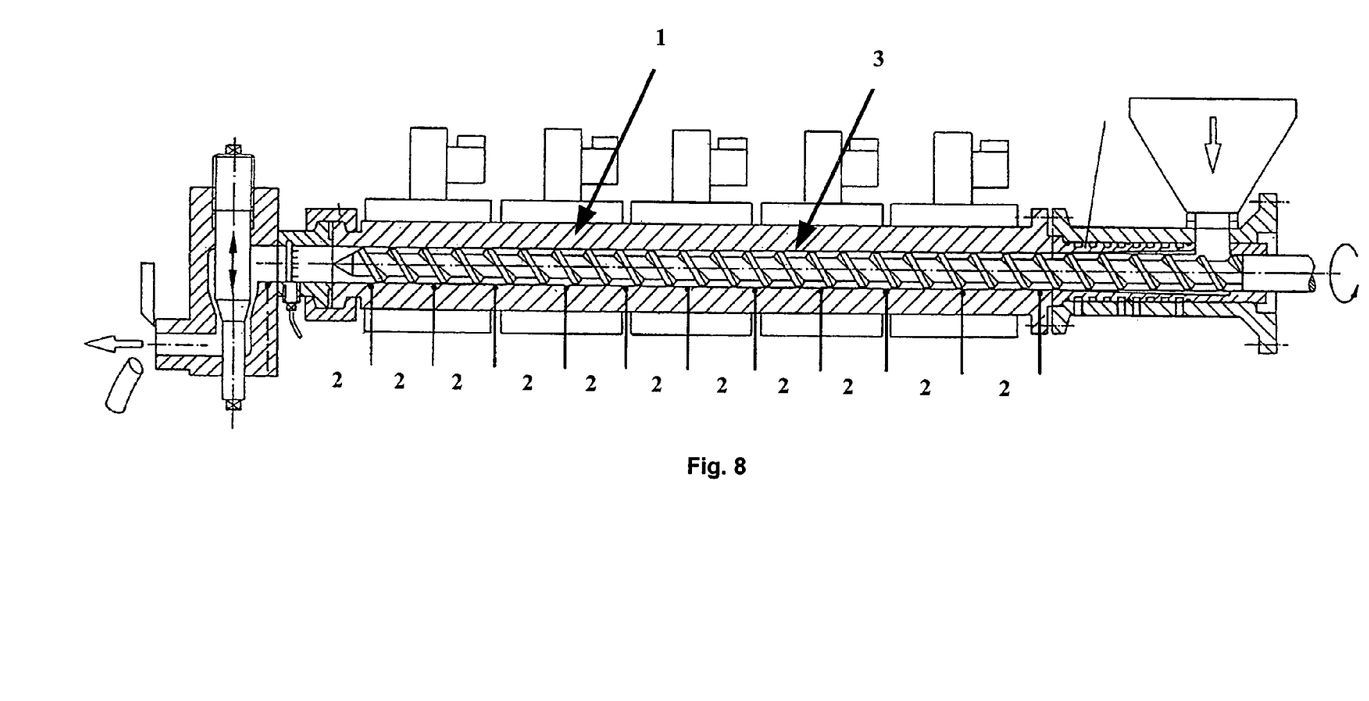
FIG. 8 shows the location of several devices along the barrel of the plasticating screw machine as a fundamental arrangement for the method to quantify the polymer melting in plasticating screw machines.
Figure 9:
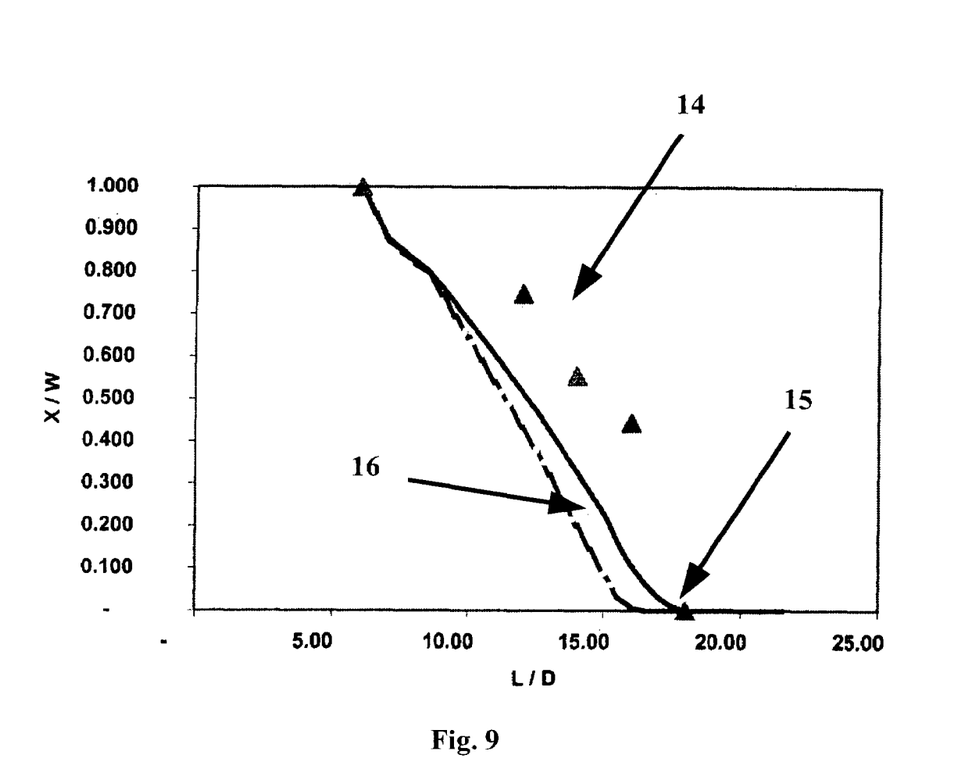
FIG. 9 shows a melting profile of a polymer obtained from a plasticating screw machine with several devices according to claims 1 to 10.

On FIG. 2 a perspective representation can be observed of the device and FIG. 3 shows an external metallic cylinder indicated as 4 to be screwed on or radially fixed with respect to the barrel of the plasticating machine 1, a bushing 7 with a clear optical window 8 to the spectrum of visible light resistant to the pressure and temperature, positioned such as that its external face 9 is tangent to the internal surface 3 of the barrel of the plasticating screw machine, and an internal metallic cylinder 5 to guide the coolant gas and enable the use of an observation probe (omitted in the FIG.) with operating temperature limits and with an illumination system. FIG. 4 illustrates the external metallic cylinder indicated as 4 with its connections 6 for the inlet and outlet of coolant gas. The internal metallic cylinder 5 is screwed on or fixed inside the external metallic cylinder 4. FIG. 5 illustrates the internal metallic cylinder 5, which possesses on its surface a spiral, baffles or deflectors 10 to guide the coolant gas throughout its length. This internal metallic cylinder receives inside the observation probe (omitted in the FIG.) with operating temperature limits and with an illumination system. FIG. 6a and FIG. 6b illustrate, as a form of carrying out the invention, an image captured from the inside of the plasticating screw machine and a scheme from where it is possible to visualize the polymer's solid state 11, the polymer's melt state 12, and the screw's flight 13. Clear differences are observed between the polymer's solid state and melt state due to the differences in density and the optical properties of each state, allowing to describe the polymer's complete melting mechanism in the plasticating screw machine. FIG. 7 shows, as a form of carrying out the invention, a barrel of another type of plasticating machine with more than one screw generically indicated by 1 that has a device screwed on or fixed, indicated by 2, and tangent to the barrel's internal surface, indicated by 3 of the plasticating machine. FIG. 8 shows as a form of carrying out the invention, the location of several devices 2 along the length of the barrel of the plasticating screw machine 1 as a fundamental arrangement for the quantification method of the polymer melting in plasticating machines. This arrangement allows to visualize in-line the development of the polymer's melting inside the plasticating machine through the observation probe (omitted in the FIG.) with an illumination system and to capture images with a camera and video recorder. A joint calibration is carried out of the optical window 8 of the device 2 and of the observation probe (omitted in the FIGS.) to determine the relationship between the visualized image and the quantified image in pixels, and thus, guarantee the precision of the measurements based on the observed images. The images allow to determine the position and width of the polymer's solids bed X, the operating conditions, and the plasticating machine's geometry using an image analyzer program or software. In the case of a plasticating machine with only one screw, X can be additionally verified with the formula: $X = Vb \cdot t \cdot \cos(90-\phi)$, where, Vb is the barrel velocity with respect to the screw, t is the time elapsed in the visualization based on the images between the screw's flank and the finalization of the solids bed, excluding the flight's width, and $\phi$ is the screw's helix angle. With X measured, it is then possible to calculate the polymer's melting profile inside the plasticating screw machine. The plasticating profile is represented by a graph of the ratio solids bed width X over screw channel width W versus the ratio of plasticating machine's length L and diameter D. The values X/W range between 0 and 1. When X/W=1, the polymer is in the solid state, and when X/W=0, the polymer is in the melt state. X values are captured from the images for different positions in the barrel of the plasticating machine L, where the devices are indicated by 2. The arrangement is shown as an example in FIG. 8 for a single screw plasticating machine. Afterwards, the polymer's melting profile is charted. FIG. 9 shows the melting profile of a polymer obtained from a plasticating screw machine with several devices as shown FIG. 8. In the case of a single screw plasticating machine or a single screw extruder, the theoretical plasticating profile can be predicted according to Tadmor's model, whose main equations are detailed below:

$$X/W = X_0 \Big/ W\left[1 - \frac{\psi(z-z_o)}{2h}\right]^2$$

$$z = L/\sin(\phi)$$

$$\psi = \frac{\Phi}{v_{sz}\rho_{solid}\sqrt{Xo}}$$

$$\Phi = \left\{\frac{v_{bx}\rho_m U_2[k_m(Tb-Tm) + U_1/2]}{2[C_s(Tm-To) + C_m\Theta(Tb-Tm) + \lambda]}\right\}^{1/2}$$

$$\delta = \left\{\frac{[2k_m(Tb-Tm) + U_1]}{v_{bx}U_2\rho_m[C_s(Tm-Tso) + C_m\Theta(Tb-Tm) + \lambda]}X\right\}^{1/2}$$

Where,

D: Diameter of the single screw extruder
L/D: Dimensionless length of the single screw extruder
h: Screw channel depth
W: Screw channel width
X: Solids bed width
$X_o$: Initial solids bed width ψ: Dimensionless volumetric flow rate
z: Position in channel's direction
$z_o$: Initial position in channel's direction
φ: Screw helix angle
Φ: Melting rate
$V_{bx}$: Barrel velocity in x direction
$V_{sz}$: Velocity of the solids bed in z direction
$\rho_{solid}$: Density of the solid polymer
$\rho_m$: Density of the melt
$U_1$, $U_2$: Parameters of Tadmor model
$k_m$: Thermal conductivity of the melt
Tb: Barrel temperature
Tm: Melting temperature
Tso or To: Initial temperature of the solids
$C_s$: Specific heat of the solid polymer
$C_m$: Specific heat of the melt
Θ: Mean dimensionless temperature
λ: Heat of fusion
δ: Melt film thickness On FIG. 9, the measured points are indicated by 14 and the predictions of the theoretical models are indicated by 15 non-Newtonian model and 16 Newtonian model; these names are due to the consideration of the polymer's viscosity. Both considerations were modeled by Tadmor.

Obviously, the above gathered description of forms of carrying out the invention that apply the innovative principles of the herein invention are given as examples, and consequently, should not be taken as a limitation of the claims.

REFERENCES

Maddock, B. H., "A Visual Analysis of Flow and Mixing in Extruder Screws", SPE-Journal, 15, pp. 383-389, 1959

Street, L. F., "Plastifying Extrusion", International Plastics Engineering, Vol. 1, PP. 289-296, 1961

Tadmor, Z. and Klein, I., "Engineering Principles of Plasticating Screw Extrusion", Van Nostrand Reinhold, New York, 1970

Tadmor, Z. and Gogos, C., "Principles of Polymer Processing", John Wiley and Sons, Inc., 1979

Wong, A. C. Y., Zhu, F., Liu, R. and Liu, T., "Break-up of solids bed in melting zone of single screw extruder. Part 1—Mathematical model", Plastics, Rubber and Composites Processing and Applications, Vol. 26, pp. 336-342, 1997

Wong, A. C. Y., Zhu, F., Liu, R. and Liu, T., "Break-up of solids bed in melting zone of single screw extruder. Part 2—Strength of solids bed and experimental results", Plastics, Rubber and Composites Processing and Applications, Vol. 26, pp. 343-350, 1997

The invention claimed is:

1. Device to visualize in-line the polymer melting in plasticating screw machines, which comprises an external metallic cylinder fixed in an external radial position relative to a barrel of the plasticating machine, a bushing with an optical window clear to the visible light spectrum resistant to pressure and temperature, positioned in such a way that its external face is tangent to the internal surface of the barrel of the plasticating machine, and an internal metallic cylinder positioned between the external metallic cylinder and the barrel of the plasticating machine to guide the coolant gas and allow the use of an observation probe with operating temperature limits and an illumination system.

2. Device according to claim 1 to be screwed on or installed in plasticating screw machines, such as single screw extruders or extruders with more than one screw, blow molding and injection molding machines.

3. Device according to claim 1 wherein the transparent optical window is manufactured of quartz, glass or sapphire with a maximum thermal resistance up to 1000° C.

4. Device according to claim 1, wherein the optical window is small, round and has a diameter equal to or less than 10 mm to not significantly affect the thermal regime of the plasticating screw machine.

5. Device according to claim 1, wherein the optical window has a minimum thickness of 6 mm to ensure the pressure resistance existing inside the plasticating screw machine.

6. Device according to claim 1 wherein the optical window can be replaced in case of damage.

7. Device according to claim 1 wherein the bushing with the optical window is a ring made of a deformable material and self-sealant under temperature and pressure.

8. Device according to claim 1 wherein the bushing is a thermoplastic material that does not melt at the operating temperature of the plasticating machine and is deformable to guarantee the self-sealant effect.

9. Device according to claim 1 wherein the internal metallic cylinder possesses on its surface a spiral, baffles or deflectors to guide the coolant gas throughout its length, to have good heat removal and preserve the observation probe with operating temperature limits and with illumination system.

10. Device according to claim 1 wherein the external metallic cylinder possesses two connections, one for the inlet and another for the outlet of the coolant gas.

* * * * *